(12) United States Patent
Christiance et al.

(10) Patent No.: US 7,529,738 B2
(45) Date of Patent: May 5, 2009

(54) ON-DEMAND SERVICE RECONCILIATION, AUDIT, AND ALERT APPARATUS AND METHOD

(75) Inventors: Kenneth D. Christiance, Apex, NC (US); Michael S. Hewett, Mount Airy, MD (US); Mark A. Maharg, Atlanta, GA (US); James H. Thomas, Morristown, IN (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 11/191,577

(22) Filed: Jul. 28, 2005

(65) Prior Publication Data
US 2007/0027846 A1    Feb. 1, 2007

(51) Int. Cl.
*G06F 17/30* (2006.01)
(52) U.S. Cl. ............... 707/3; 725/11; 707/6; 715/255; 714/6
(58) Field of Classification Search ............ 707/3; 725/11
See application file for complete search history.

(56) References Cited
U.S. PATENT DOCUMENTS

| | | | |
|---|---|---|---|
| 6,236,365 B1 * | 5/2001 | LeBlanc et al. ............. 342/457 |
| 6,385,731 B2 * | 5/2002 | Ananda ............. 726/6 |
| 6,400,996 B1 | 6/2002 | Hoffberg et al. .......... 700/83 |
| 6,779,021 B1 | 8/2004 | Bates et al. ............ 709/206 |
| 6,795,404 B2 | 9/2004 | Slemmer et al. ............ 370/270 |
| 6,862,529 B2 | 3/2005 | Brown et al. ............ 702/3 |
| 7,103,149 B1 * | 9/2006 | Depaolantonio ........... 379/9.02 |
| 7,124,101 B1 * | 10/2006 | Mikurak ............ 705/35 |
| 7,194,451 B2 * | 3/2007 | Chaudhuri et al. ........... 707/2 |
| 7,233,948 B1 * | 6/2007 | Shamoon et al. .............. 707/9 |
| 7,246,181 B2 * | 7/2007 | Rosing ........... 710/18 |

* cited by examiner

*Primary Examiner*—John R. Cottingham
*Assistant Examiner*—Noosha Arjomandi
(74) *Attorney, Agent, or Firm*—Yee & Associates, P.C.; Libby Z. Handelsman; Rudolf O. Siegesmund

(57) ABSTRACT

An audit tool (AT) operates in cooperation with an audit tool manager (ATM), a policy file (PF) and a query file (QF) in order to provide a real time display of usage within an on-demand service system. The ATM identifies the data to be gathered. Using the ATM, the user identifies comparison points, maps the comparison points to audit controls, defines policies and develops SQL queries to report transactions and record quantities. The AT gathers data, displays the gathered data, and compares the data points, and alerts the user to a discrepancy. The AT displays the compared data points side by side so that real time visual verification can be made, and the AT also alerts the user to discrepancies.

1 Claim, 11 Drawing Sheets

ON-DEMAND SERVICE RECONCILIATION, AUDIT, AND ALERT APPARATUS AND METHOD

FIELD OF THE INVENTION

The present invention relates to data processing in general, and to an apparatus and method for monitoring and analyzing comparison points in an on-demand service environment where billing is based on usage metering of service contracts.

BACKGROUND OF THE INVENTION

For many years, information technology (IT) organizations (the "providers") have offered IT management services and computing resources to other business entities (the "customers"). In a "traditional" service model, the customers share a provider's management services, but each customer purchases or leases specific resources for the customer's exclusive benefit. The customer may purchase or lease the resources directly from the provider or from a third party. Regardless of their origins, though, such a purchase or lease may require extensive, time-consuming negotiations based upon the customer's anticipated requirements. If the customer's requirements are less than anticipated, then the customer effectively has wasted resources. If, however, the customer's requirements are greater than anticipated, then the customer may have to enter into additional time-consuming negotiations for the necessary resources.

Alternatives to the traditional service model, though, are able to anticipate and meet customers' processing needs as their requirements grow, while maximizing existing resources. One such alternative, pioneered by International Business Machines Corporation, allows a service provider to allocate resources to customers "on-demand" as the customers' needs change. In this on-demand service model, customers share computing and networking resources. In one implementation of the on-demand model, a service provider creates "logical" partitions of computing resources on primary processing units (commonly known as "mainframe" computers). Typically, an on-demand service provider contracts with several customers to provide a certain level of service to each customer, and creates a logical partition (LPAR) of resources for each customer to fulfill its obligations. Unlike traditional service contracts, an on-demand service contract generally requires that the customer be billed only for resources actually used, and for fixed costs not directly related to usage (such as labor costs incurred in support of the contract).

In an on-demand data center, software is shared, simultaneously serving multiple customers in a flexible, automated fashion. The software is standardized, requiring little customization, and it is scalable, providing capacity on demand in a pay-as-you-go model. The software can be stored on a shared file system accessible from one or more servers. The software is executed via transactions that contain data and server processing requests that use processing resources on the accessed server. The accessed server also may make requests of other servers that require the use of processing resources. The use or consumption of processing resources is measured in units of time such as minutes, seconds, or hours. A CPU is one example of a processing resource, but other resources that may be consumed and measured include (but are not limited to) network bandwidth, memory, storage, packet transfers, complete transactions, etc.

In the on-demand service environment, problems arise when voids or inaccuracies occur in the metered data. Such voids or inaccuracies create incorrect calculations. Correcting the incorrect calculations requires processing delays and causes lost revenue. Therefore, significant time must be expended to validate data integrity and to resolve issues that are discovered in the validation process. Incorrect calculations discovered during post processing procedures result in late submissions for bills and reports. In order to resolve the incorrect calculation, the on-demand service administrator must discover the time of origin of the data issue, remove the erroneous data from the on demand metering, reporting and billing system, reprocess the data, and revalidate the outputs. Such corrective procedures result in late billing and reporting, as well as significant time expenditures to resolve and validate the data integrity.

A need exists for a way to identify problems in on-demand service data as the data is generated so that problems can be resolved in close temporal proximity to the time of origin. Moreover, the need extends to both on-demand service providers, and to on-demand service clients to view usage of metered services in real time, and to be alerted to problems.

SUMMARY OF THE INVENTION

The invention that meets the need identified above is an audit tool (AT) that operates in cooperation with an audit tool manager (ATM), a policy file (PF) and a query file (QF) to provide a real time display of usage within an on-demand service system. The ATM identifies the data to be gathered. Using the ATM, the user identifies comparison points, maps the comparison points to audit controls, defines policies and develops Structured Query Language (SQL) queries to report transactions and record quantities. The AT gathers data, displays the gathered data, compares the data points, and alerts the user to a discrepancy. The AT displays the compared data points side by side so that real time visual verification can be made. Additionally, the AT alerts the user to the discrepancies.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the audit tool (AT).

Figure 1:
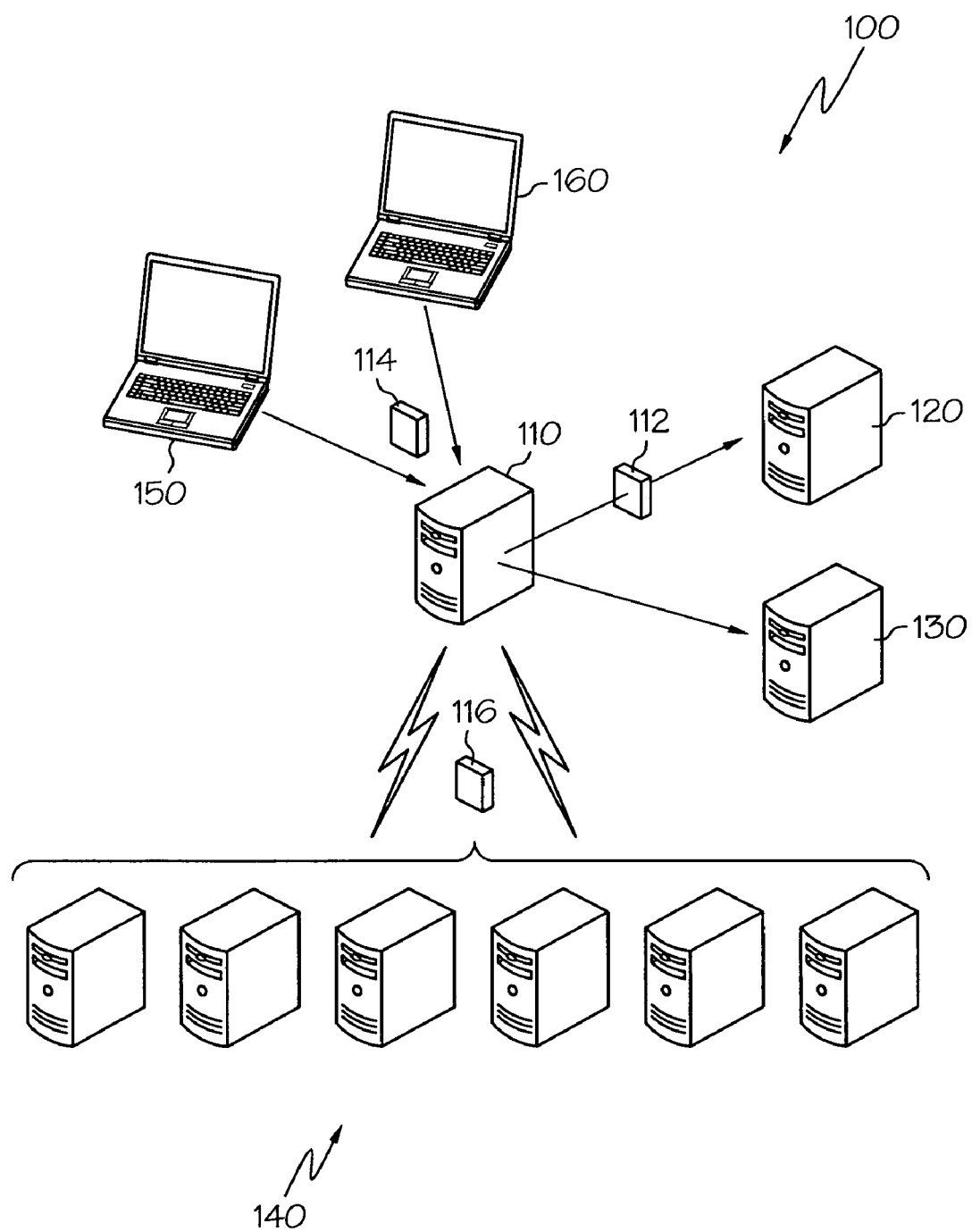
FIG. 1 illustrates an illustration of a system in which the audit tool may be employed.

Additionally, the AT is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including user accounts application server 110, Lightweight Directory Access Protocol (LDAP) computer 120, application stored data views server 130, on demand services servers 140, billing administrator computer 150 and account executive computer 160. User accounts application server 110 is connected to on-demand services servers 140 by first network connection 116. Billing administrator computer 150 and account executive computer 160 are connected to user accounts application server 110 by second network connection 114. LDAP computer 120 and application stored views server 130 are connected to user accounts application server 110 by third network connection 112. First network 116, second network 114, and third network 112 comprise all hardware, software, and communications media necessary to enable communication between network nodes 110 through 160. Unless otherwise indicated in context below, all network nodes use publicly available protocols or messaging services to communicate with each other through first network connections 112, second network connection 114 and third network connection 116.

Figure 2:
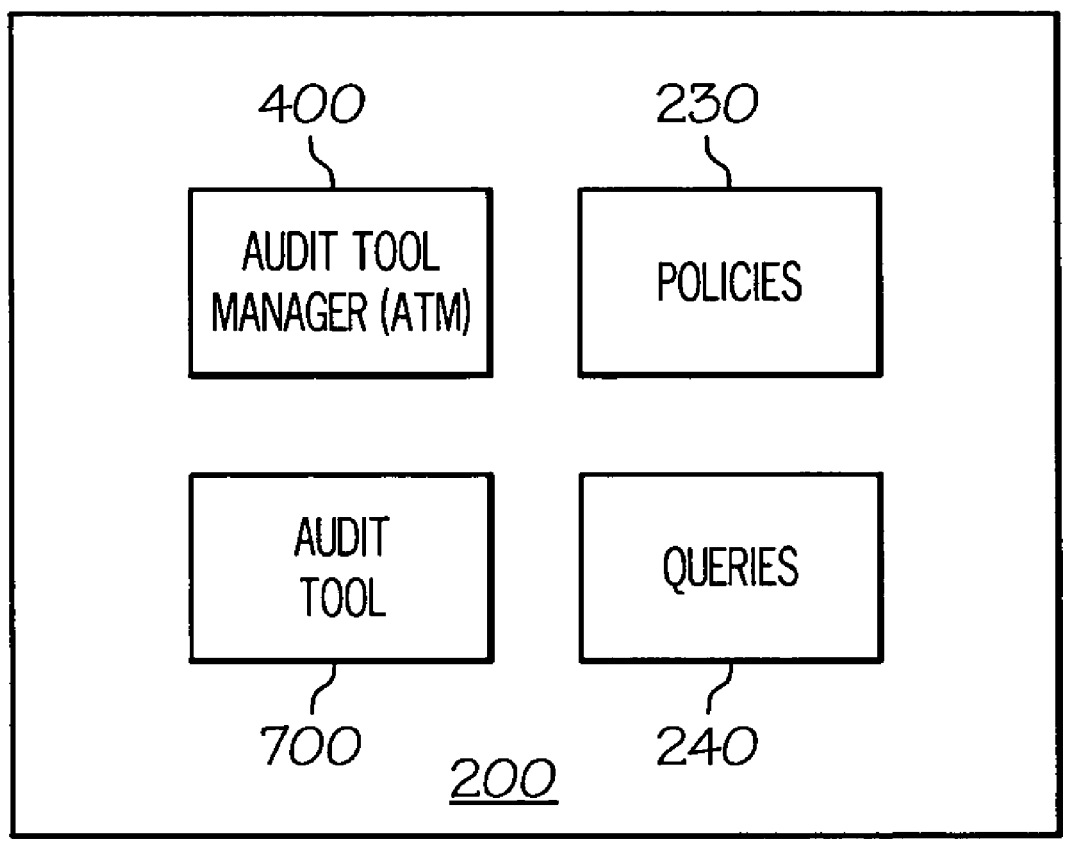
FIG. 2 depicts an exemplary storage containing the programs and files of the invention.

AT 700 typically is stored in a storage, represented schematically as storage 200 in FIG. 2. The term "storage," as used herein, includes without limitation any volatile or persistent medium, such as an electrical circuit, magnetic disk, or optical disk, in which a computer can store data or software for any duration. A single storage may encompass and be distributed across a plurality of media. Thus, FIG. 2 is included merely as a descriptive expedient and does not necessarily reflect any particular physical embodiment of storage 200. As depicted in FIG. 2, though, storage 200 may include additional data and programs. Of particular import to AT 700, storage 200 includes audit tool manager (ATM) program 400, policy file (PF) 230, and query file (QF) 240.

An on-demand operating environment is based upon the concepts of a service oriented architecture (SOA). In an SOA, every application or resource is modeled as a service that implements a specific, identifiable function (or set of functions). In an on-demand environment, the services often implement specific business functions, but also may implement interfaces or other operating functions.

Services in SOAs communicate with each other by exchanging structured information, typically through messages or documents. The services' capabilities are defined by interfaces declaring messages they can produce or consume, policy annotations declaring a quality of service required or provided, and choreography annotations declaring behavioral constraints that must be respected in service interactions. The actual implementation of any specific service is hidden from the service requester, which allows new and existing applications to be quickly combined into new contexts.

Figure 3:
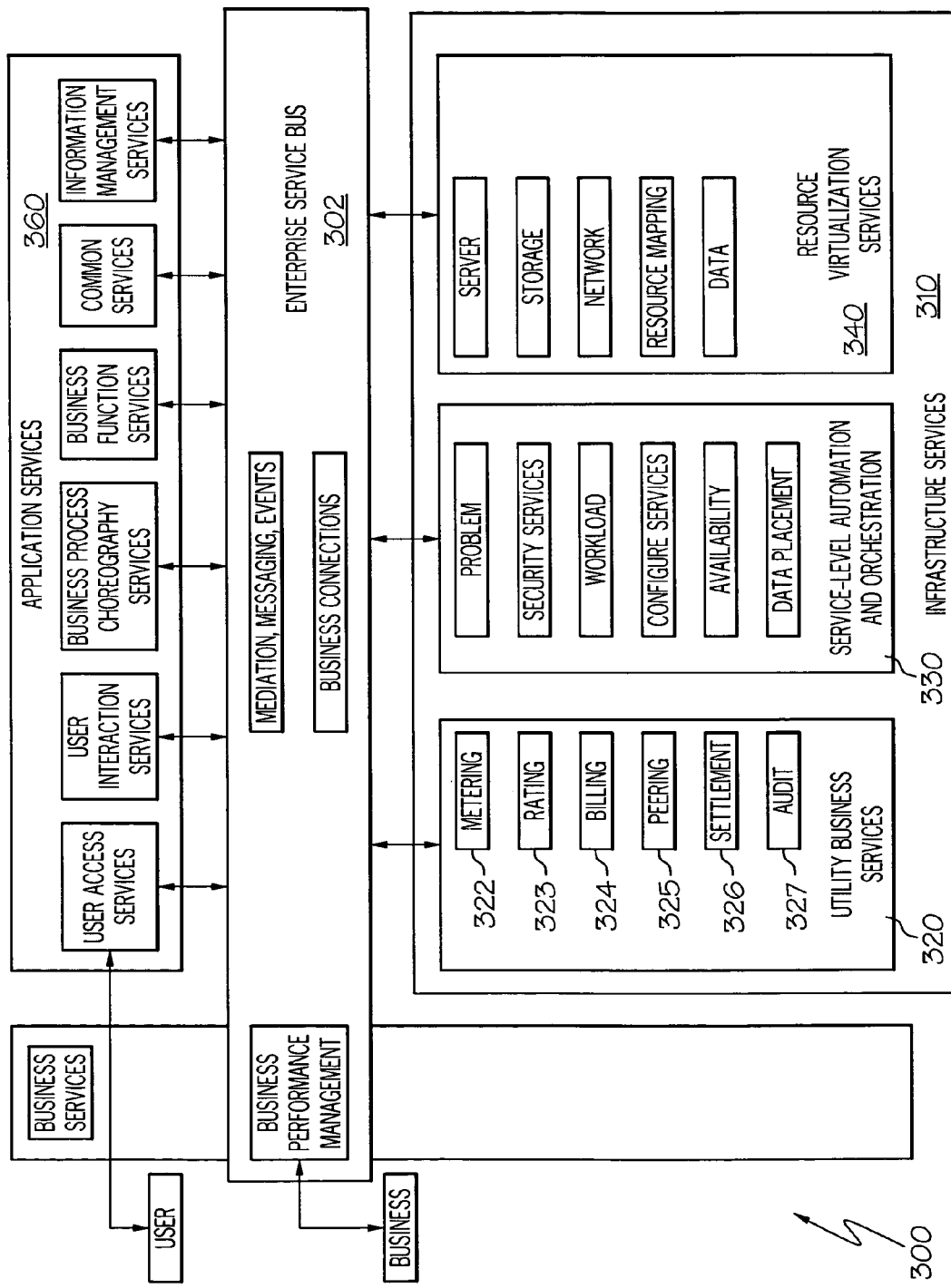
FIG. 3 depicts an exemplary service oriented architecture.

FIG. 3 provides an overview of SOA 300. At the system level, components of the environment are system objects such as servers, storage, and data. At the application level, components are dynamically integrated application modules that constitute sophisticated, yet much more flexible applications. At the business level, the components are business objects, defined for particular vertical industries or more generally, as they apply horizontally across industries.

Typically, a specific on-demand business service relies on many other services in its implementation. All interactions between services flow through an Enterprise Service Bus (ESB) such as ESB 302. ESB 302 facilitates mediated interactions between service end points. ESB 302 supports event-based interactions, as well as message exchange for service request handling. For both events and messages, mediations can facilitate interactions by, for example, locating services that provide requested capabilities, or by handling interface mismatches between requesters and providers that are compatible in terms of their capabilities. AT 700 and ATM 400 are suitable for inclusion with utility business services 320 as audit service 327. When ATM 700 and ATM 400 are included as audit service 327, PF 230, and QF 240 are located in application services 360. For example, ATM 700, ATM 400, PF 230, and QF 240 may be employed in conjunction with IBM's AIX advanced accounting service within SOA 300. Alternatively, AT 700, ATM 400, PF 230 and QF 240 may be employed independently from SOA 300.

Figure 4:
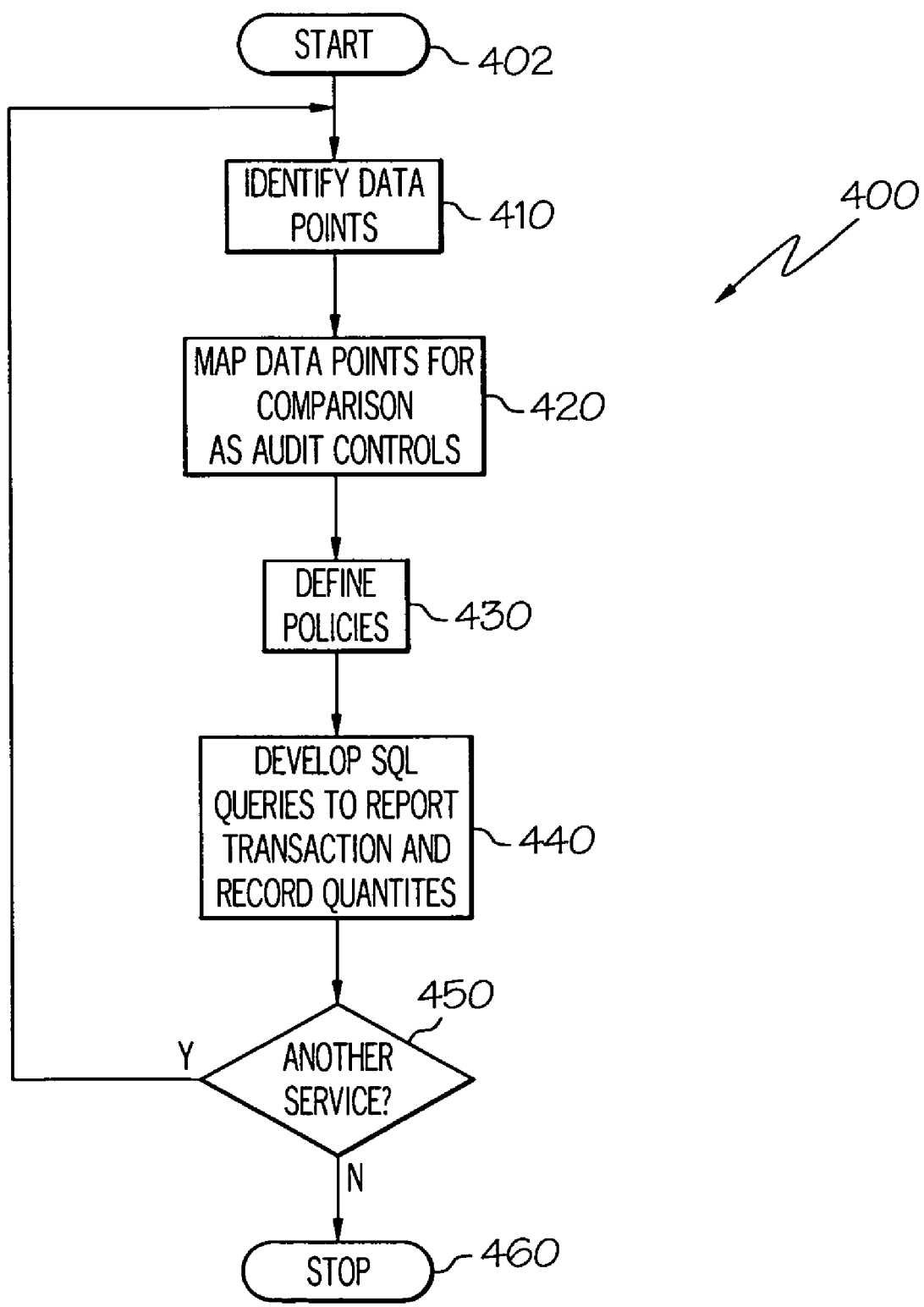
FIG. 4 depicts a flowchart of the audit tool manager program.

FIG. 4 depicts a flowchart of audit tool manager (ATM) program 400. ATM 400 starts (402) and prompts the user to identify data points (410). For each system to be monitored by AT 700, the user analyzes the service system data transfer points to identify separate points in the system where the same data may be accessed. Sets of data points are selected so that the data can be compared to determine whether each set of data points complies with an audit policy. The sets of data points are selected by first, identifying the originating point for a particular data item and all points in the system where the particular data item has been manipulated. Second, the user creates a set of data points by selecting the originating point for a particular data item and the last point in the system where the particular manipulated data item appears. A discrepancy in compliance with an audit policy indicates a validation failure. The audit policies are placed into PF 230 (see FIG. 2) for access by AT 700 (see FIG. 7). After the data points are identified, the user maps data points for comparison as an audit control (420). Next, ATM 400 causes the user to define policies (430) for the audit control. The user then develops SQL queries to retrieve the data from the data points for comparison (440). The SQL queries are placed into QF 240 (see FIG. 2) for access by AT 700 (see FIG. 7). Data may be gathered through log analysis and through custom reports. ATM 400 determines whether there is another service to audit (450), and if so, goes to step 410, or if not, ends (460).

Figure 5A:
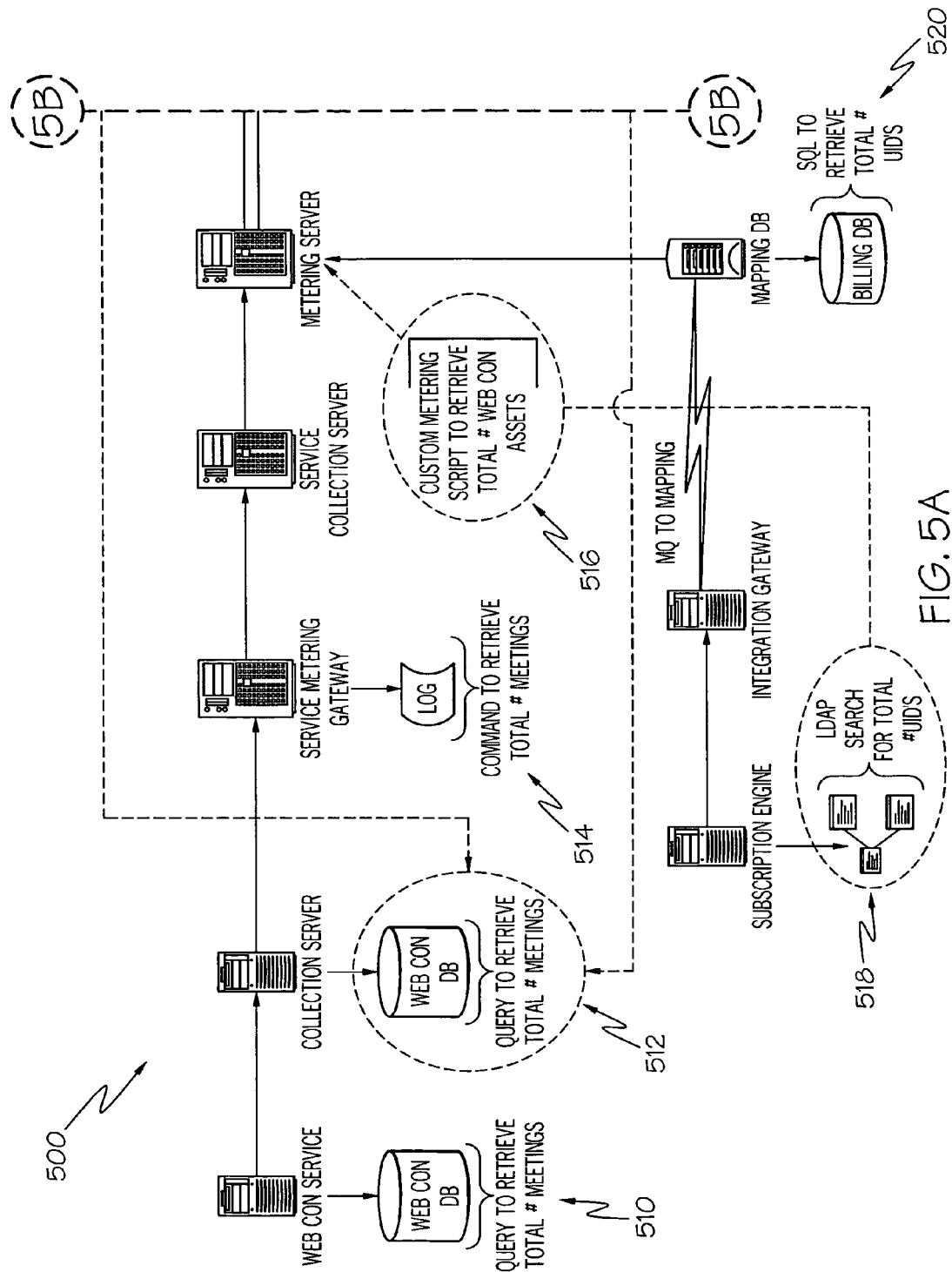
FIG. 5A depicts a messaging architecture adapted for operation of the audit tool.
Figure 5B:
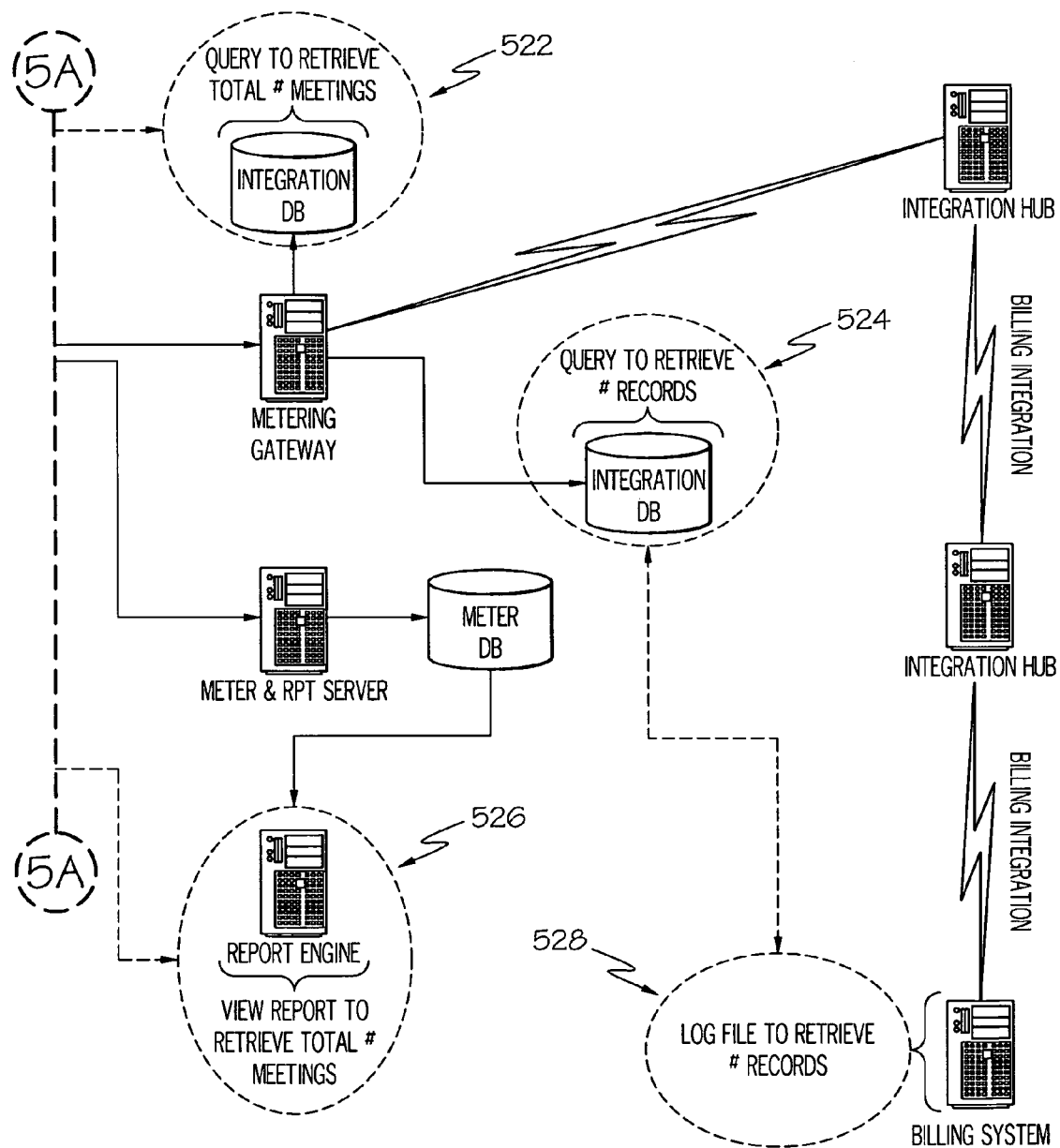
FIG. 5B depicts a messaging architecture adapted for operation of the audit tool.

FIG. 5A and FIG. 5B depict a representation of a typical web conferencing service to which ATM 400 may be applied. In order to enter data points into ATM 400, a user must analyze the architecture of the system to be audited. In this example, the web conferencing service depicted in FIG. 5A and FIG. 5B is analyzed and data points are identified. Web conferencing database 510 receives data regarding the total number of web conferencing meetings from the web conferencing service server and from the collection server. The service metering gateway log 514 also indicates the total number of meetings. The billing integration database 522 contains data indicating the total number of web conferencing meetings. Likewise, the billing integration database contains data regarding the number of records 524. The billing system server log file 528 contains data indicating the total number of records. The subscription engine 518 contains data indicating the total number of user identification numbers. The billing database 520 contains data indicating the total number of user identification numbers.

In the example, the user selects data points and maps pairs of data points together for comparison as audit controls in accordance with ATM 400. Web Conferencing Data Base 512 is mapped to report engine 526. Web conferencing data base 512 is mapped to billing integration database 522. Billing integration database 524 is mapped to billing system 528. Metering server 516 is mapped to subscription engine 518. Web Conferencing Data Base 512 is mapped to report engine 526. Integration database 524 is mapped to billing system 528.

Next policies are defined. Web Conferencing Data Base 512 is mapped to report engine 526 that produces a report regarding the total number of meetings. Report engine 526 retrieves its data from the meter database. Therefore, the total number of meetings recorded in web conferencing data base 512 must equal the total number of meetings recorded by report engine 526. If at any given point in time these values are not the same, then an error has occurred in the system. The total number of meetings indicated by web conferencing data base 512 must equal the total number of meetings recorded in billing integration database 522. If at any given point in time these values are not the same, then an error has occurred in the system. In addition, the total number of records in the billing integration data base and the total number of records in the billing system must be the same, or an error has occurred. Therefore, the number of records in integration database 524 must be the same as the number of records in billing system 528. In an on-demand service oriented environment, resources are allocated as required, and these on-demand assets are tracked by user identification number. Therefore, at any point in time, the total number of web conferencing assets indicated by the metering server 516 must equal the total number of user identification numbers indicated by subscription engine 518. These policies can be defined as follows:

1. If the collection server total number of meetings does not equal the reporting total number of meetings, then alert.
2. If the collection server total number of meetings does not equal the billing integration database total number of meetings, then alert.
3. If the metering integration number of records does not equal the billing number of records, then alert.
4. If the web conference LDAP total number of user identification numbers does not equal the report engine's total number of web conferencing assets, then alert.

These policies are entered into PF 230 for access by AT 700.

Figure 6A:
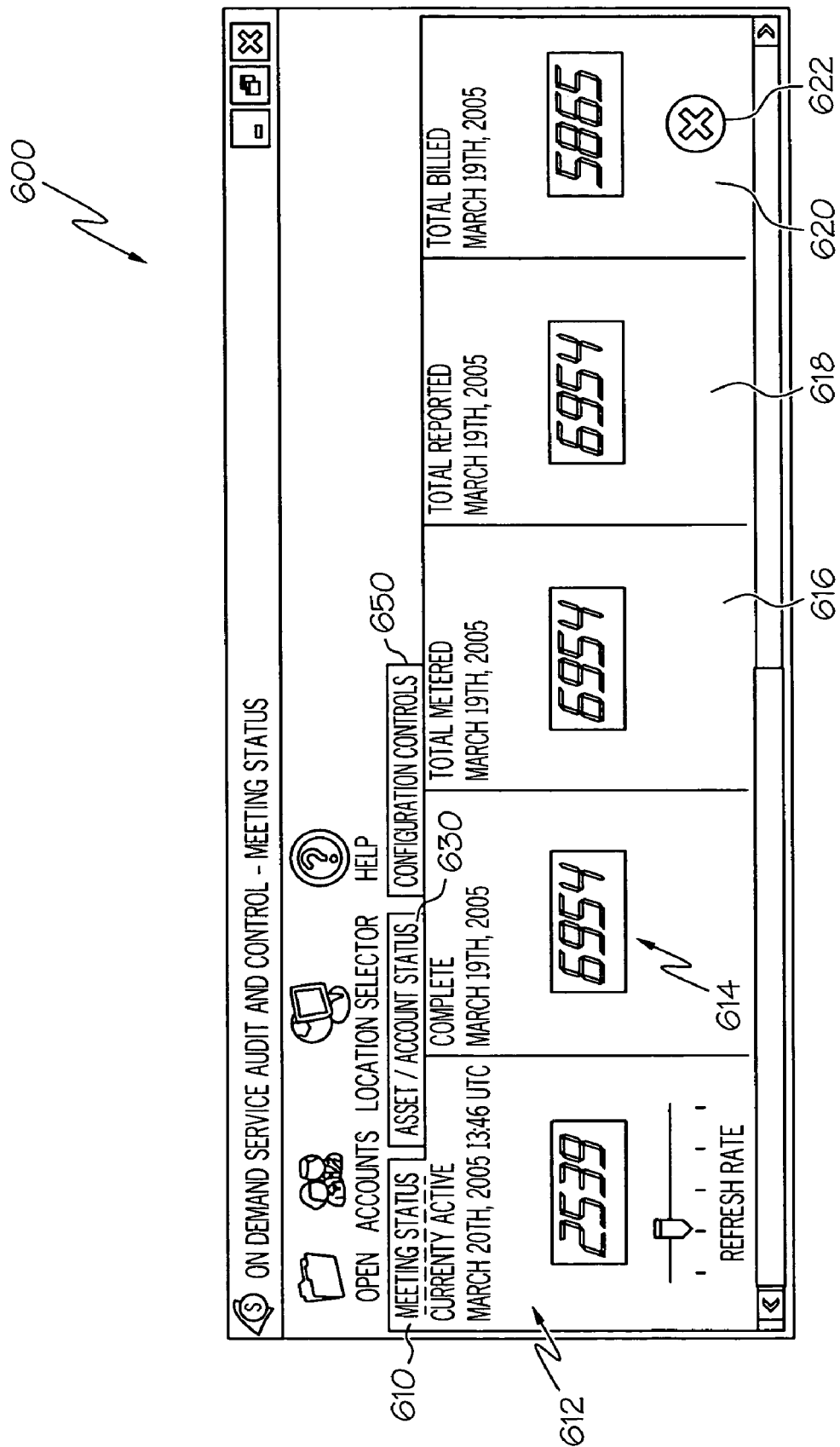
FIG. 6A depicts a meeting status display for the audit tool.

Once the pairs of data points have been selected, the data points mapped to each other for comparison, and the policies defined, the user enters SQL queries to retrieve the transaction and record quantities from the data points. FIG. 6A depicts audit tool graphical user interface 600. Audit tool graphical user interface 600 may be toggled between different comparison views, and in the example, has meeting status tab 610, asset/account status tab 630 and configuration controls tab 650. In FIG. 6A, meeting status 610 is shown. Meeting status 610 displays currently active web conferences 612, completed web conferences 614, total metered web conferences 616, total reported web conferences 618, and total billed web conferences 620. In the example, completed web conferences 614, total metered web conferences 616, and total reported web conferences 618 each indicate a value of 6954 so that policies 1 and 2 are satisfied. However, the total number of web conferences billed 620 indicates only 5865. Therefore, policy 3 is not met, and alert 622 is displayed.

Figure 6B:
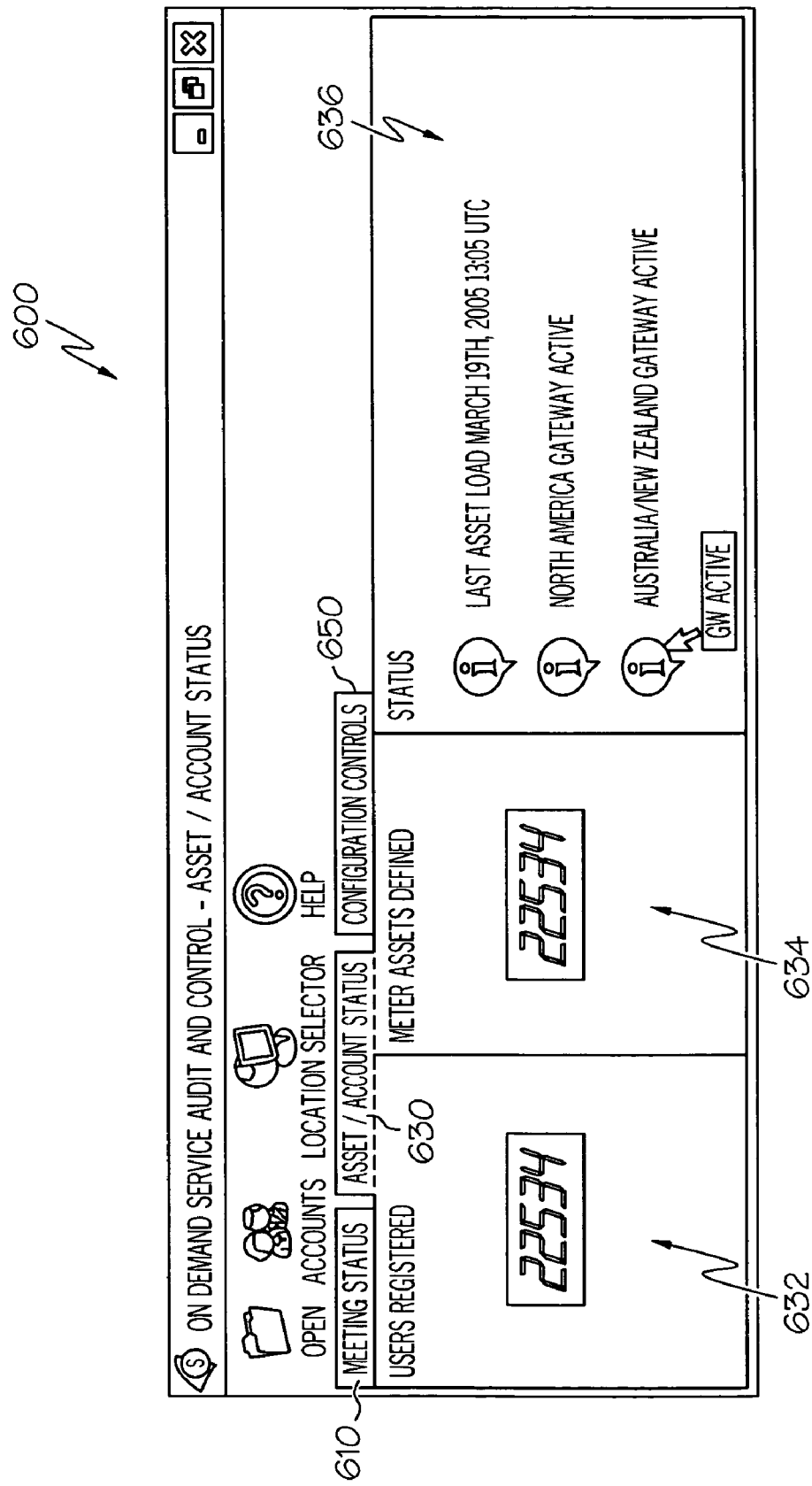
FIG. 6B depicts an asset/account status display for the audit tool.
Figure 6C:
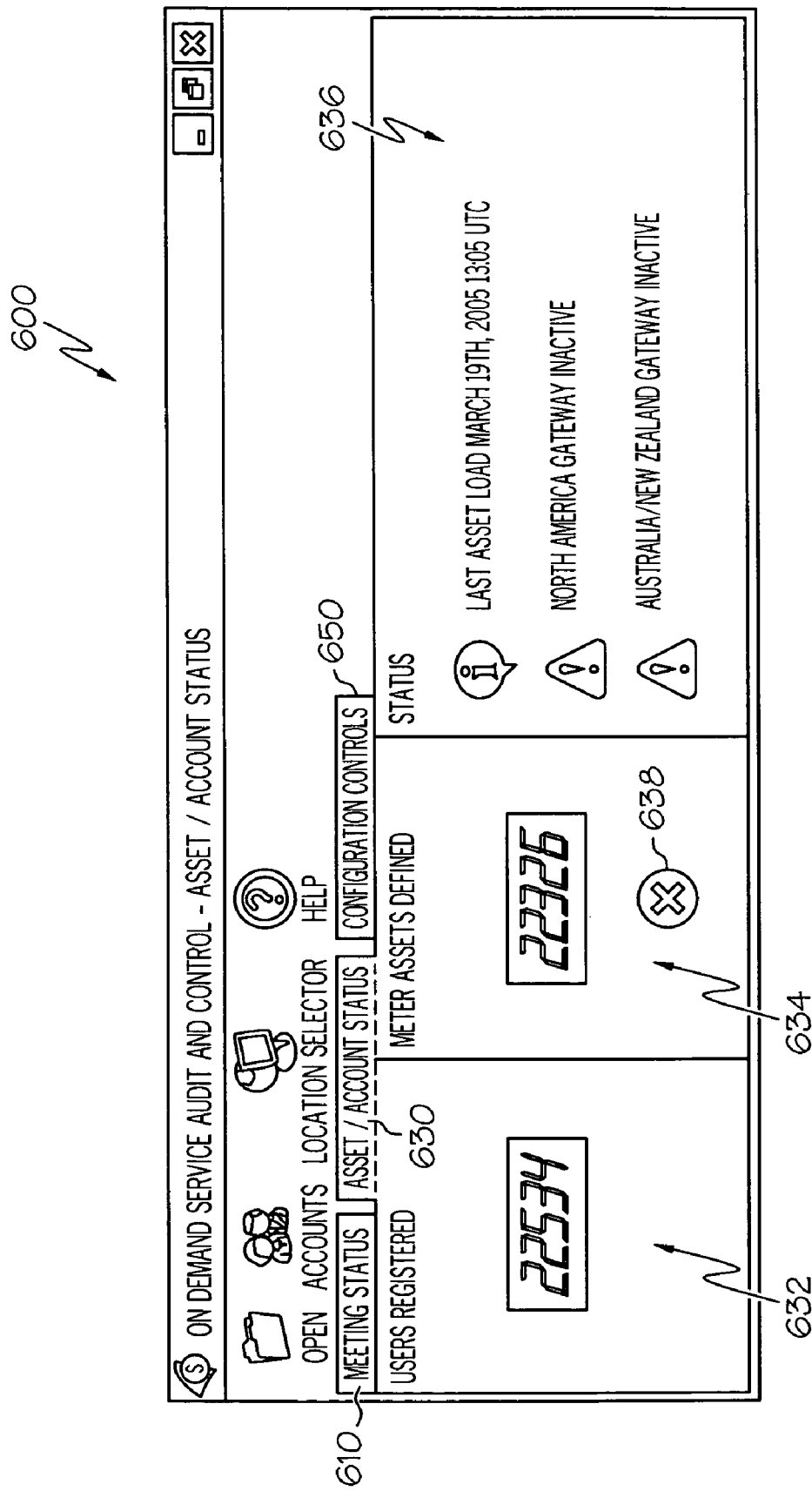
FIG. 6C depicts an asset/account status display for the audit tool.

FIG. 6B shows asset/account display 630. Users registered 632 displays a value of 22534, and meter assets defined 634 displays a value of 22534. Therefore, policy 4 is met. Status area 636 provides indication regarding the system. In FIG. 6C, users registered 632 displays a value of 22534, and meter assets defined 634 displays a value of 22326. Therefore, policy 4 is not met, and AT 700 displays alert 638.

Figure 6D:
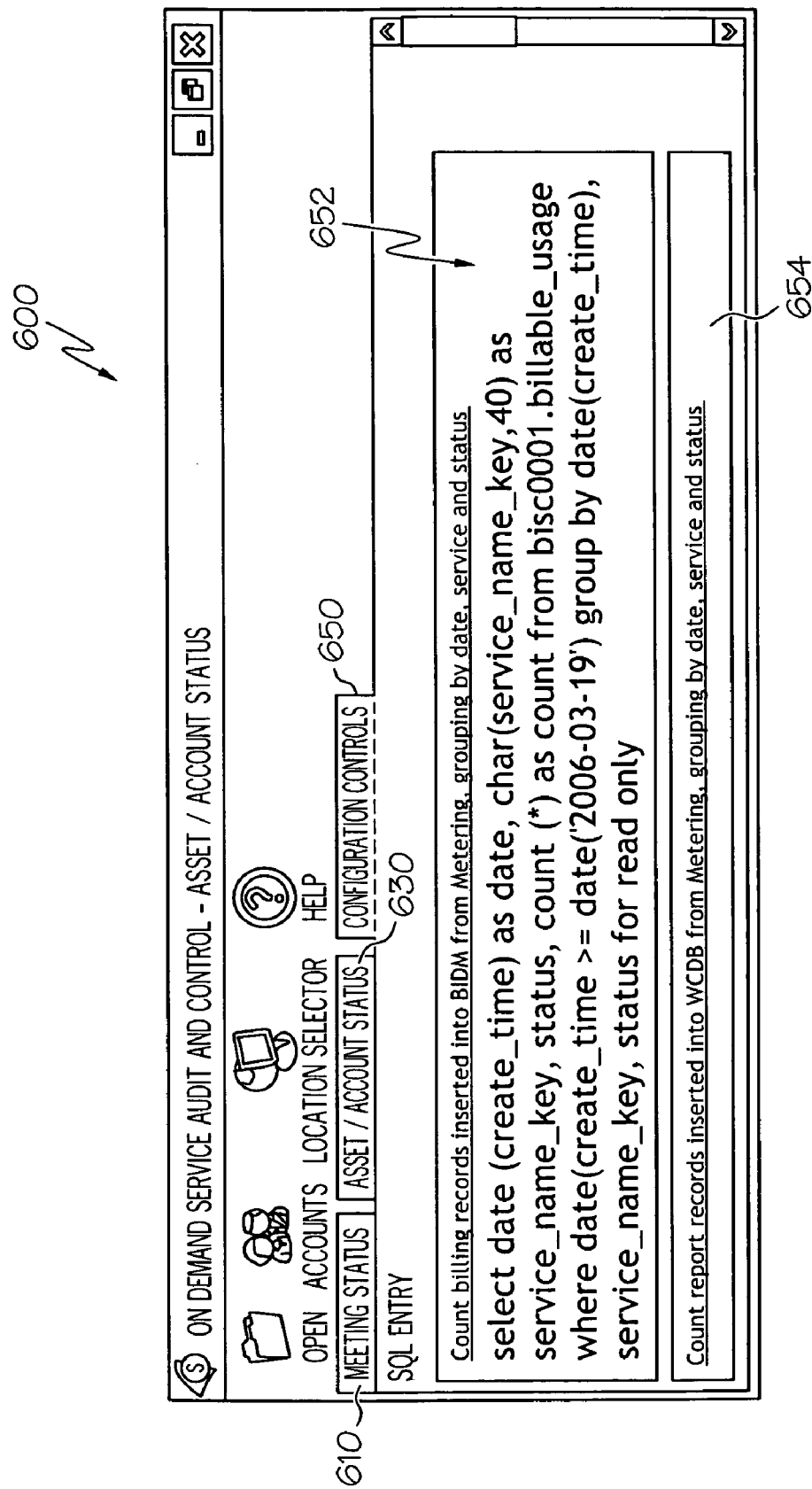
FIG. 6D depicts a configuration controls display for the audit tool.

FIG. 6D shows configuration controls display 650. Each of the SQL entries for retrieving data for AT 700 may be viewed by scrolling.

Figure 7:
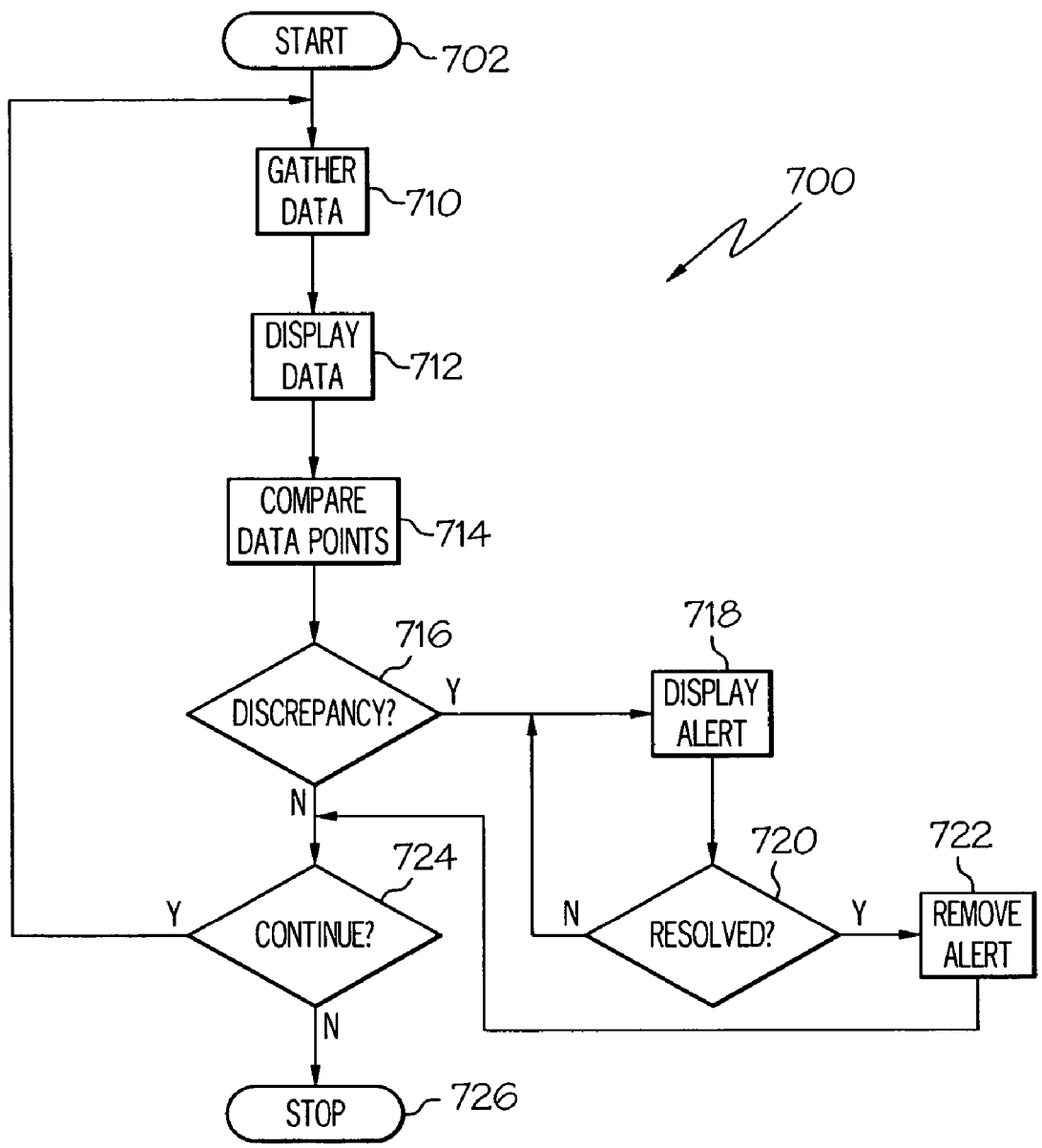
FIG. 7 depicts a flow chart of the audit tool.

FIG. 7 depicts a flow chart for AT 700. AT 700 starts (702), gathers data from the selected data points for comparison (710), and displays the data (712). Each of the data points are compared (714) and a determination is made whether a discrepancy exists. The determination of whether or not a discrepancy exists (716) is made by determining whether an applicable policy has been violated. If a discrepancy exists, the alert is displayed (718). The alert will remain on display until AT 700 will determine whether the discrepancy has been resolved (720). If so, AT 700 removes the alert (722), and if not, continues to display the alert (718). If AT 700 removes the alert, or if no discrepancy is found at step 716, then AT 700 determines whether to continue (724). If so, AT 700 goes to step 710, and if not, AT 700 stops (726).

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed:

1. A method for validating data integrity of an on-demand service system that bills for resources actually used, comprising:
    identifying at least two separate points in the on-demand service system where a data item is accessible;
    identifying an originating point in the on-demand service system of the data item;
    identifying a last point in the on-demand service system where the data item appears;
    using a SQL query, gathering a plurality of values from each separate point in the on-demand service system where the data item is accessible;
    displaying the plurality of values side by side on a graphical user interface so that a real time visual verification is enabled:
    determining if the plurality of values complies with an audit policy; and
    when a discrepancy exists with the compliance of the plurality of values with the audit policy, displaying an alert;
    wherein the discrepancy is that one or more of the plurality of values are not equal;
    wherein the separate points of the on-demand service system where the data item is accessible comprise: at least one server log file and at least one database; and
    wherein a data integrity of the on-demand service system is validated.

* * * * *